Feb. 27, 1968 R. J. CAMILLE, JR 3,371,145

CRYOGENIC HEAT EXCHANGER ELECTRICAL LEAD

Filed Oct. 7, 1966 2 Sheets-Sheet 1

RICHARD J. CAMILLE JR.
INVENTOR.

BY Alden D. Redfield
Melvin E. Frederick
ATTORNEYS

CRYOGENIC HEAT EXCHANGER ELECTRICAL LEAD

Filed Oct. 7, 1966 2 Sheets-Sheet 2

RICHARD J. CAMILLE JR.
INVENTOR.

BY Alden D. Redfield
Melvin E. Frederick
ATTORNEYS 3,371,145

CRYOGENIC HEAT EXCHANGER ELECTRICAL LEAD

Richard J. Camille, Jr., Gloucester, Mass., assignor to Avco Corporation, Cincinnati, Ohio, a corporation of Delaware Filed Oct. 7, 1966, Ser. No. 585,175
8 Claims. (Cl. 174—15)

The present invention is directed to electrical leads and more particularly to electrical leads for devices immersed in a cryogenic medium.

The provision of current via electrical current leads between a warm region (as compared to a cryogenic region) and a cryogenic region, such as for example the interior of a Dewar containing liquid helium, results in the introduction of heat into the cryogenic region. The introduction of heat called "heat leak" results from the combined effect of Joule heating in the leads and heat conduction along the leads from a warm region to the cold or cryogenic region. It is of course desirable to reduce this heat leak to a minimum in order that the cost of the refrigeration, which is required to keep the cryogenic region at a constant temperature, is as low as possible.

Where the cryogenic region is comprised of a liquid coolant bath, attempts have been made to reduce the quantity of heat reaching the coolant bath by cooling the electrical leads for the device immersed in the coolant bath with the boil-off gas produced by heat which does reach the bath. Such cooling of the leads is particularly attractive with helium which has the property that a pound of helium warmed from liquid temperature to room temperature absorbs about eighty times as much heat as the same pound of liquid helium will absorb when evaporated. For a discussion of an exemplary prior art cooled electrical lead, the solution of the equations of steady heat flow in cooled leads and the design of such leads, reference is made to "Counterflow Current Leads for Cryogenic Applications" by J. E. C. Williams in Cryogenics, vol. 3, No. 4, December 1963, published by Hewood and Co. Ltd., London and New York.

It is an object of the present invention to provide an improved electrical lead for cryogenic devices.

It is another object of the present invention to provide for cryogenic devices an electrical lead having as a characteristic more efficient heat exchange by reason of its construction and arrangement.

A further object of the present invention is to provide an electrical lead for cryogenic devices which is simple and economical of construction, and which is practical and reliable in operation.

A still further object of the present invention is to provide an electrical lead for cryogenic devices which is more compact, light in weight, which has a low gas pressure drop and which can carry high currents.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
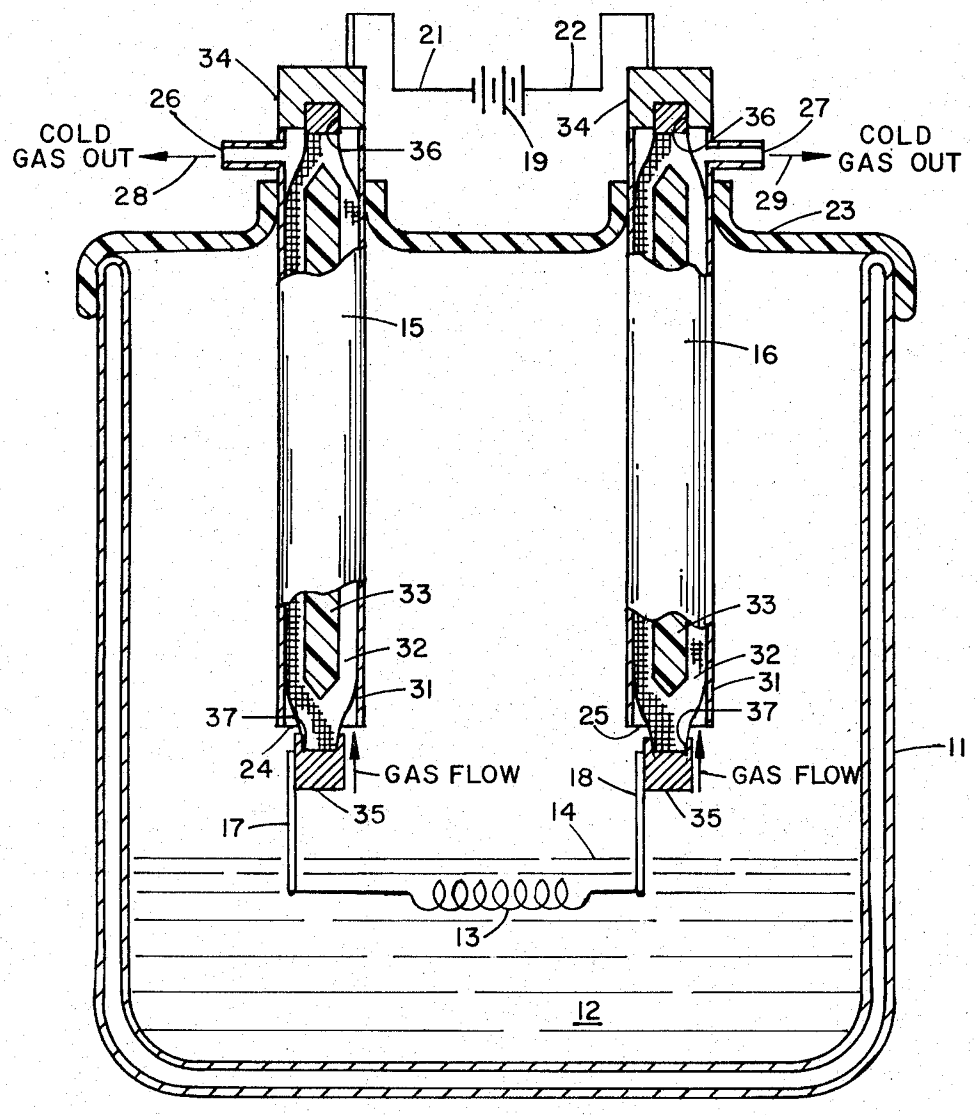
FIGURE 1 is a sectional side view of a Dewar defining a cryogenic region containing electrical leads in accordance with the present invention.

Referring to FIGURE 1, there is shown a Dewar 11 containing a cryogenic liquid 12, such as for example liquid helium. Immersed in the cryogenic liquid 12 is an electrically conductive load 13 intended to be operated at cryogenic temperatures, i.e., the temperature of, for example, liquid argon, helium, hydrogen, neon, nitrogen, or oxygen. Although shown as a coil, the electrically conductive load 13 may be any kind of device or load requiring a supply of electrical current.

Above the surface 14 of the cryogenic liquid 12 are provided two hollow and elongated electrical leads designated respectively by the numerals 15 and 16 which convey current between a warm region (the region exterior of Dewar 11) and a cryogenic region (the liquid 13 in the interior of the Dewar 11 for example). The leads 15 and 16 also vent the boil-off gas produced by the heat which does reach the cryogenic liquid 12, thereby reducing heat leak into the cryogenic region via the electrical leads 15 and 16.

The electrical leads 15 and 16 are connected to the load 13 via conductors 17 and 18 and to a source of current designated by battery 19 via conductors 21 and 22.

The open end of the Dewar is sealed by a cover 23 adapted to receive and electrically insulate from each other electrical leads 15 and 16. The boil-off gas enters the leads at their open ends 24 and 25 adjacent to the cryogenic liquid and leaves the leads at their ends 26 and 27 in the warm region. The warm region incidentally need not be at room temperature but merely at a temperature greater than that of the cryogenic region. For example, the cryogenic region may be at substantially the temperature of liquid helium, whereas the region exterior of the Dewar receiving the boil-off gas may be at substantially the temperature of liquid nitrogen. The boil-off gas leaving each lead designated by the arrows 28 and 29 may be collected in conventional manner and reliquified or may be permitted to escape into the atmosphere. The transfer tube for the cryogenic liquid has been omitted for clarity.

Figure 2:
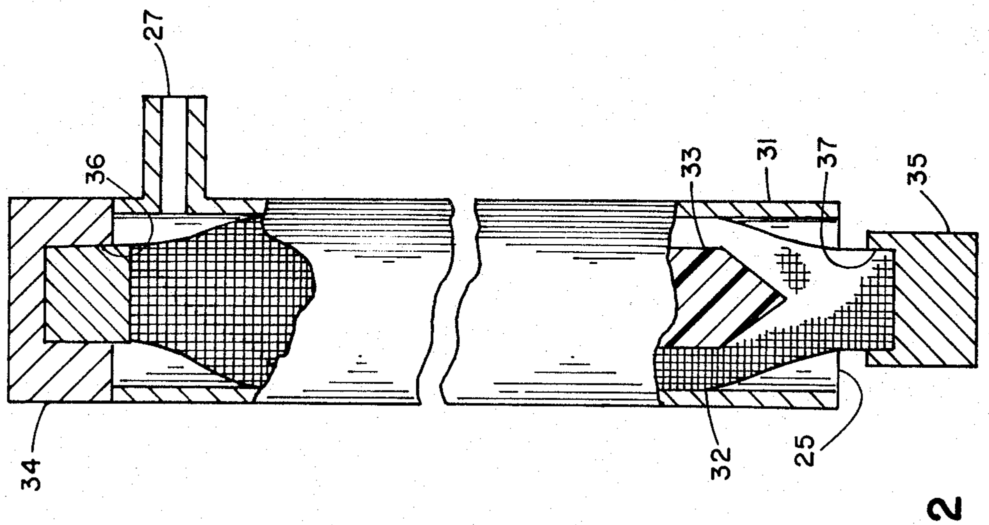
FIGURE 2 is a sectional side view of an electrical lead in accordance with the present invention.

Directing attention now to the electrical leads 15 and 16 which are identical and particularly to FIGURE 2, which shows one of the leads in greater detail, it will be noted that each lead comprises a hollow member 31 which preferably is a poor thermal conductor. Disposed within each hollow member, which may be either rigid or flexible, are heat transfer means 32 comprising an electrically conductive mesh screen or cloth extending substantially the effective length of each hollow member 31. Most conveniently, the heat transfer means 32 are formed of a copper mesh screen rolled into a cylinder and filling the hollow members. To facilitate winding and provide an adequate packing factor, the screening may be rolled on rod 33.

Commercially available 40 x 40 copper mesh screen or wire cloth 32 has been found to be satisfactory for current flows of 400 amperes. The material selected for the mesh screen should be a good electrical conductor such as ETP or OFHC copper, silver, aluminum or the like. The better the electrical conductivity of the mesh screen, the better will be the performance of the lead. For current carrying and heat exchange means in accordance with the invention, the strands of the mesh screen extending in the length direction carry the current and the transverse or radial strands function as cooling members. Accordingly, the radially disposed strands should have a high thermal conductivity and be in good thermal contact with the axially disposed strands. Further, since in accordance with the present invention a large number of small conductors are used, the effective surface area exposed to and in contact with the coolant is maximized and this in combination with the transverse strands provides maximum heat transfer. Still further, the existence of the transverse and axial strands throughout the entire length of the conductor in close and preferably in substantially contacting relationship insures maximum contact between the coolant and the current carrying strands while permitting adequate venting of the Dewar. As may now be apparent, for optimum performance, none of the strands should be insulated as this reduces the heat transfer efficiency of the conductor.

To insure maximum heat transfer for a given contract carrying capacity the axially disposed strands need be separated only a very small distance one from another as is also the case for the radially disposed strands. The strands may if desired be soldered one to another to increase the heat transfer characteristics of the conductor.

Figure 3:
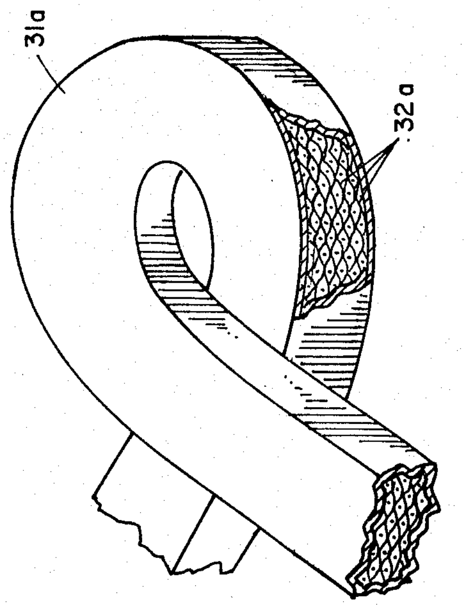
FIGURE 3 is a fragmentary view with parts broken away showing a modification.

Electrical end terminals 34 and 35 are provided to permit connection of the conductor to the aforementioned power and load leads. Whereas a particular configuration of the end terminals 34 and 35 is not important, maximum electrical contact between the mesh screen and the end terminals is achieved by, for example, soldering or crimping the ends of the mesh screen to the end terminals. Provision of suitable recesses 36 and 37 in the end terminals and inserting the extreme ends of the mesh screen therein and soldering the axially disposed strands to the end terminals has been found to be satisfactory. While the mesh screen material may be attached in a variety of ways to the end terminals as by soft soldering, hard soldering, crimping and the like, it is important only that the method selected provide a low resistance electrical path between the end terminals and the mesh screen. The shape of the lead and hence the shape of the mesh screen may comprise substantially any configuration that is desired or convenient. Accordingly, the lead may be circular, octagonal, square, rectangular, triangular and the like in cross section. The screen material may be wrapped, rolled, folded, and cut into elongated strips.

Where heat transfer conditions require leads of a length greater than that available in a given Dewar, the lead may be wound in the form of a helix or coil. In this case, it may be preferable to utilize a more or less rectangular outer member **31*a* filled with strips 32*a*** of mesh screen as shown in FIGURE 3 to facilitate bending of the conductor. Since it is neither necessary nor intended that the outer member carry current and that accordingly, it preferably be a poor conductor of heat and that it preferably have poor thermal conductive characteristics, it can be formed of substantially any suitable material either rigid or flexible such as, for example, stainless steel, fiber glass, epoxy, rubber and the like that will withstand the temperature range to which it is subjected. The principal purpose of the outer member is to confine the gas flow through the electrically conductive portion of the conductor.

By way of illustration, for the embodiment shown in FIGURE 1, the length and width of a given mesh screen or wire cloth can be calculated for the desired optimum current by use of the equation:

$$B=2I\frac{l}{a}\sqrt{\frac{\alpha}{K}} \qquad (1)$$

where:

B is the optimum current parameter (dimensionless);
I is the current in amperes;
$l$ is the effective conductor length in centimeters;
$a$ is the effective cross sectional area of the conductor in square centimeters;
$\alpha$ is an approximation of the linear temperature coefficient of resistance in ohms centimeters per degree Kelvin;
K is the effective thermal conductivity in watts per centimeter per degree Kelvin.

Assuming a given material, such as copper or aluminum, for the mesh screen, a given mesh comprising wire having a given diameter, given inlet and exit gas temperatures, the specific heat and latent heat of the coolant, and a required lead length, Equation 1 can be solved for $a$ and the required width of mesh screen readily determined. Where the screen is to be rolled on a rod, the required diameters may be determined from the equation:

$$r_{\text{inside}}=\sqrt{r^2_{\text{outside}}-\frac{\text{width of screen}\times\text{thickness}}{\pi}} \qquad (2)$$

For a lead such as shown in FIGURE 3 utilizing strips of mesh screen, the width dimension of the lead should equal approximately the thickness of the number of layers of screen required.

In order to demonstrate both the practicality and efficiency of construction and operation, two sets of leads constructed in accordance with the present invention were fabricated and tested. Both sets of leads used the same type of conductor which is to say copper wire cloth having forty strands per inch in both the vertical and horizontal runs, each strand being .010" diameter with a .0150" opening between strands. The vertical length of each lead was 34". Using Equation 1 to determine the current parameter, an optimum current of 1.395 amperes per strand was determined for the condition that the lead operate from 4.2° K. at the cool end to 300° K. at the warm end.

The first set of leads were constructed using arbitrary width of 7½" wire cloth to provide an optimum current of 418 amperes. The helium boil-off was computed to be 1.043 liters per hour by use of equation:

$$A=m\frac{C_p}{K}\times\frac{l}{a} \qquad (3)$$

where:

A is the optimum flow parameter (dimensionless);
$m$ is the gas flow rate in grams per second;
$C_p$ is the specific heat of the gas at constant pressure in Joules per gram per degree Kelvin.

Directing attention now to FIGURE 3, there is shown a lead in accordance with the invention which is particularly useful for situations requiring a long conductor length versus vertical height available in a Dewar. As shown in FIGURE 3, the outer member **31*a* is filled with a plurality of separate flat mesh screens 32*a*. It is significant to note that in this embodiment, a filler rod such as shown in FIGURE 2 is not required. In fact, for the embodiment shown in FIGURE 2 the rod 33** may be eliminated if the screen is compressed or rolled tight enough to prevent unobstructive gas flow through the conductor. The volume of screen material in this case is determined in the same manner described hereinabove. The volume or width of the rod as the case may be is selected to provide the optimum packing factor while permitting adequate venting of the Dewar.

While the gas flow through the lead should be directed through the mesh screen only, it should enter the lead as close as practicable to the bottom of the mesh screen material and leave as close as practicable to the top of the mesh screen material. While an unobstructed gas flow path should not exist, it is only necessary that a relatively good packing factor be maintained for good heat conduction from the mesh screen material to the gas. Further, the gas flow rate through the conductor as noted hereinabove must be at least equal to the boil-off rate created by the lead and heat leak into the Dewar. The present invention is particularly advantageous in that it permits the use of relatively inexpensive wire screen or cloth, the wire screen or cloth simultaneously functions as the current carrying conductor and heat exchange member, and the conductor is readily susceptible to simple, inexpensive and short fabricating techniques. The present invention also permits a substantially increased flexibility in design with regard to size and optimum current carrying capacities. For example, many different optimum current leads may be used in the same size outer member simply by varying the width of screen or wire cloth and the size of the center rod. Further, different mesh sizes may be used and the mesh screen conductor is readily adaptable to substantially any type of end connection desired and to different venting systems.

As will now be apparent, considerable latitude is available in the design of leads in accordance with the invention. Whereas a wide variety of lead configurations are available, as well as a wide variety of conductor size and spacing, in choosing a given set of dimensions and the like, it is only necessary that those be chosen which will provide local conductor temperatures as close as practically possible to the local gas temperature. Broadly speaking, in a short lead, the number of axially disposed conductors should be maximized whereas in longer leads, comparatively speaking, the number of conductors may be reduced.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

What is claimed is:

1. In an elongated electrical lead wherein a cold gas in a cryogenic region passes through said electrical lead to a warmer region, the combination comprising:

(a) an elongated hollow member for receiving said gas;

(b) electrically conductive mesh screen means disposed in said hollow member, said means comprising a plurality of closely spaced substantially axially disposed electrical conductors extending substantially the length of said hollow member in contact with a plurality of closely spaced conductors disposed at substantially right angles to said axially disposed conductors, said conductors at least substantially filling said hollow member whereby said gas during flow through said lead must flow substantially only through said mesh screen means; and (c) an electrically conductive end terminal member disposed at opposite ends of said mesh screen means and in electrical contact with respective opposite ends of said axially disposed conductors.

2. The combination as defined in claim 1 wherein said mesh screen means fills said outer member.

3. The combination as defined in claim 1 wherein said mesh screen means comprises a plurality of flat strips disposed one on top of the other in contacting relationship.

4. The combination as defined in claim 1 and additionally including a filler rod substantially concentric about the longitudinal axis of said lead and said mesh screen is rolled on said rod and fills the remainder of said hollow member.

5. The combination as defined in claim 1 wherein said lead defines a spiral.

6. In an elongated electrical lead for supplying a predetermined magnitude of electrical current and a warmer region between a cryogenic region wherein a cold gas in said cryogenic region passes through said electrical lead to said warmer region, the combination comprising:

(a) an elongated hollow member for receiving said gas;

(b) electrically conductive mesh screen means disposed in said hollow member, said means comprising a plurality of closely spaced substantially axially disposed electrical conductors extending substantially the length of said hollow member each in contact with a plurality of closely spaced conductors disposed at substantially right angles to said axially disposed conductors, said conductors at least substantially filling said hollow member whereby said gas during flow through said lead must flow substantially only through said mesh screen means; and (c) an electrically conductive end terminal member disposed at opposite ends of said mesh screen means and in electrical contact with respectively opposite ends of said axially disposed conductors, the size, number and spacing of the conductors comprising said mesh screen means when carrying said predetermined current providing a temperature gradient in said lead intermediate said end terminal members not substantially different from the temperature gradient of said gas flowing through said lead.

7. The combination as defined in claim 6 wherein said mesh screen means has an electrical conductivity of the order of copper, the number of axially disposed conductors is of the order of the rated current of said lead, and the spacing of said conductors one with respect to another is not substantially greater than the diameter of said conductors whereby substantially all of the gas flowing through said lead is substantially continuously in contact with said conductors.

8. The combination as defined in claim 7 wherein the number of axially disposed leads is approximately equal to the number of amperes which said lead is designed to carry.

References Cited

UNITED STATES PATENTS

| | | | |
|---|---|---|---|
| 3,349,161 | 10/1967 | Latham | 174—15 |
| 3,278,808 | 10/1966 | Bonfeld | 317—123 |
| 3,295,931 | 1/1967 | Hulliger | 23—315 |
| 3,109,963 | 11/1963 | Geballe | 317—123 |

DARRELL L. CLAY, *Primary Examiner.*

A. T. GRIMLEY, *Assistant Examiner.*